US012737246B2

(12) United States Patent
D'Angelo

(10) Patent No.: US 12,737,246 B2
(45) Date of Patent: Sep. 15, 2026

(54) CIRCUIT AND METHOD FOR TASK MONITORING

(71) Applicant: STMicroelectronics International N.V., Geneva (CH)

(72) Inventor: Giuseppe D'Angelo, Tufino (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1 day.

(21) Appl. No.: 18/943,119

(22) Filed: Nov. 11, 2024

(65) Prior Publication Data

US 2025/0225015 A1 Jul. 10, 2025

(30) Foreign Application Priority Data

Jan. 4, 2024 (IT) ........................ 102024000000096

(51) Int. Cl.
*G06F 11/07* (2006.01)

(52) U.S. Cl.
CPC ...... *G06F 11/0772* (2013.01); *G06F 11/0757* (2013.01); *G06F 11/0778* (2013.01)

(58) Field of Classification Search
CPC ............. G06F 11/0772; G06F 2201/86; G06F 2201/835; G06F 2201/865; G06F 11/0757; G06F 11/0739; G06F 11/3013; G06F 11/3055; G06F 11/3419; G06F 11/0778
See application file for complete search history.

(56) References Cited

U.S. PATENT DOCUMENTS 5,005,142 A * 4/1991 Lipchak .............. G06F 11/0709 73/114.61
7,346,813 B1 * 3/2008 Schulz ................ G06F 11/2268 714/48
9,753,773 B1 * 9/2017 Borlick ................. G06F 9/5094
10,627,947 B2 * 4/2020 Kono ...................... G06F 3/044
(Continued)

OTHER PUBLICATIONS

Convent, Lukas et al., "HardWare-Based Runtime Verification With Embedded Tracing Units and Stream Processing", Springer Link, RV 2018, LNPSE, vol. 11237, https://link.springer.com/chapter/10.1007/978-3-030-03769-7_5, Nov. 8, 2018, 21 pages.
Kovacshazy, Tamas et al., "Prototype Implementation and Performance of Time-based Distributed Scheduling on Linux for Real-Time Cyber-Physical Systems", IEEE International Symposium on Precision Clock Synchronization for Measurement, Control, and Communication (ISPCS), Sep. 30, 2018, 6 pages.
(Continued)

*Primary Examiner* — Kamini B Patel
(74) *Attorney, Agent, or Firm* — Slater Matsil, LLP

(57) ABSTRACT

A monitoring circuit performing logical and temporal task monitoring of a plurality of tasks comprises a task recording circuit and a task management circuit receiving as input a plurality of task signals, each task signal being indicative of an execution state of a respective task. The task management circuit comprises a managing circuit configured to operate in at least three modes depending on a respective event corresponding to either detection of a rising edge of a given task signal, occurrence of a trigger signal, or detection of a falling edge of a given task signal being monitored. In each mode the managing circuit is configured to check whether a variable representing the operation state of the task contains an expected value corresponding to the occurrence of the event enabling the respective mode, and output a result of the check operation in an error signal for the given task being monitored.

21 Claims, 8 Drawing Sheets

(56) References Cited

U.S. PATENT DOCUMENTS

| | | | | |
|---|---|---|---|---|
| 2004/0095081 | A1* | 5/2004 | Kernahan | H05B 41/3927 315/307 |
| 2008/0133175 | A1* | 6/2008 | LoBuono | G06F 11/008 714/E11.154 |
| 2009/0237110 | A1* | 9/2009 | Lunzer | G01R 31/31917 326/38 |
| 2011/0239196 | A1* | 9/2011 | Ichard | G06F 11/3636 717/127 |
| 2018/0107512 | A1* | 4/2018 | Borlick | G06F 9/4893 |
| 2024/0248719 | A1* | 7/2024 | Mehta | G06F 9/3842 |
| 2024/0385610 | A1* | 11/2024 | Chou | G05B 23/0218 |

OTHER PUBLICATIONS

NXP, "Safety Manual for MPC5744P Devices Supported: MPC574xP", Document No. MPC5744PSM, Rev. 3, Jun. 2014, 161 pages.

Solet, Dimitry et al., "HW-based Architecture for Runtime Verification of Embedded Software on SoPC systems", NASA/ESA Conference on Adaptive Hardware and Systems (AHS), Aug. 6-9, 2018, 8 pages.

Stmicroelectronics, "Search Report and Written Opinion", IT Application No. 202400000096, dated Jul. 9, 2024, 8 pages.

Stmicroelectronics, "Safety Application Guide for SPC563Mxx family", AN4475 Application Note, DocID026216 Rev 1, May 2014, 26 pages.

* cited by examiner

CIRCUIT AND METHOD FOR TASK MONITORING

CROSS-REFERENCE TO RELATED APPLICATIONS

This application claims the benefit of Italian Patent Application No. 102024000000096, filed on Jan. 4, 2024, which application is hereby incorporated herein by reference.

TECHNICAL FIELD

The solutions here described relate to techniques for performing logical and temporal task monitoring of a plurality of tasks executed in a processing system.

One or more embodiments may be applied to processing systems, in particular in embedded systems, in particular systems operating according to the ISO26262 standard.

BRIEF DESCRIPTION OF THE DRAWINGS

Timing is an important property of embedded systems. Safe behavior requires that the system performs its actions and reactions within the right time. The right time can be described in terms of a set of timing constraints that have to be satisfied. Logical flow and temporal flow monitoring of program sequences is used in the automotive industry and mentioned in the ISO26262 standard, "Road vehicles-Functional safety", in particular table D.10, which is an international standard for functional safety of electrical and/or electronic systems that are installed in serial production road vehicles, as countermeasures to detect failures of the processing units (e.g., the CPU of a microcontroller). In the standard ISO26262, to achieve the highest level of diagnostic coverage, both logical flow and temporal flow monitoring are implemented.

The logical flow monitoring checks the sequence of executed program tasks by the processing system to detect a defective program sequence. A defective program sequence exists if the individual tasks of a program (e.g., software modules, functions, or statements) are processed in the wrong sequence. The temporal flow monitoring checks the reliability of program execution in consideration of periodicity and maximum timing constraints of periodicity. Both these specific software countermeasures are run periodically to detect and react to a fault within a FTTI (Fault Tolerant Time Interval), where FTTI is defined as the time-span in which a fault or faults can be present in a system before a hazardous event occurs. The typical value for FTTI is in the range between 1 ms and 10 ms.

Figure 1:
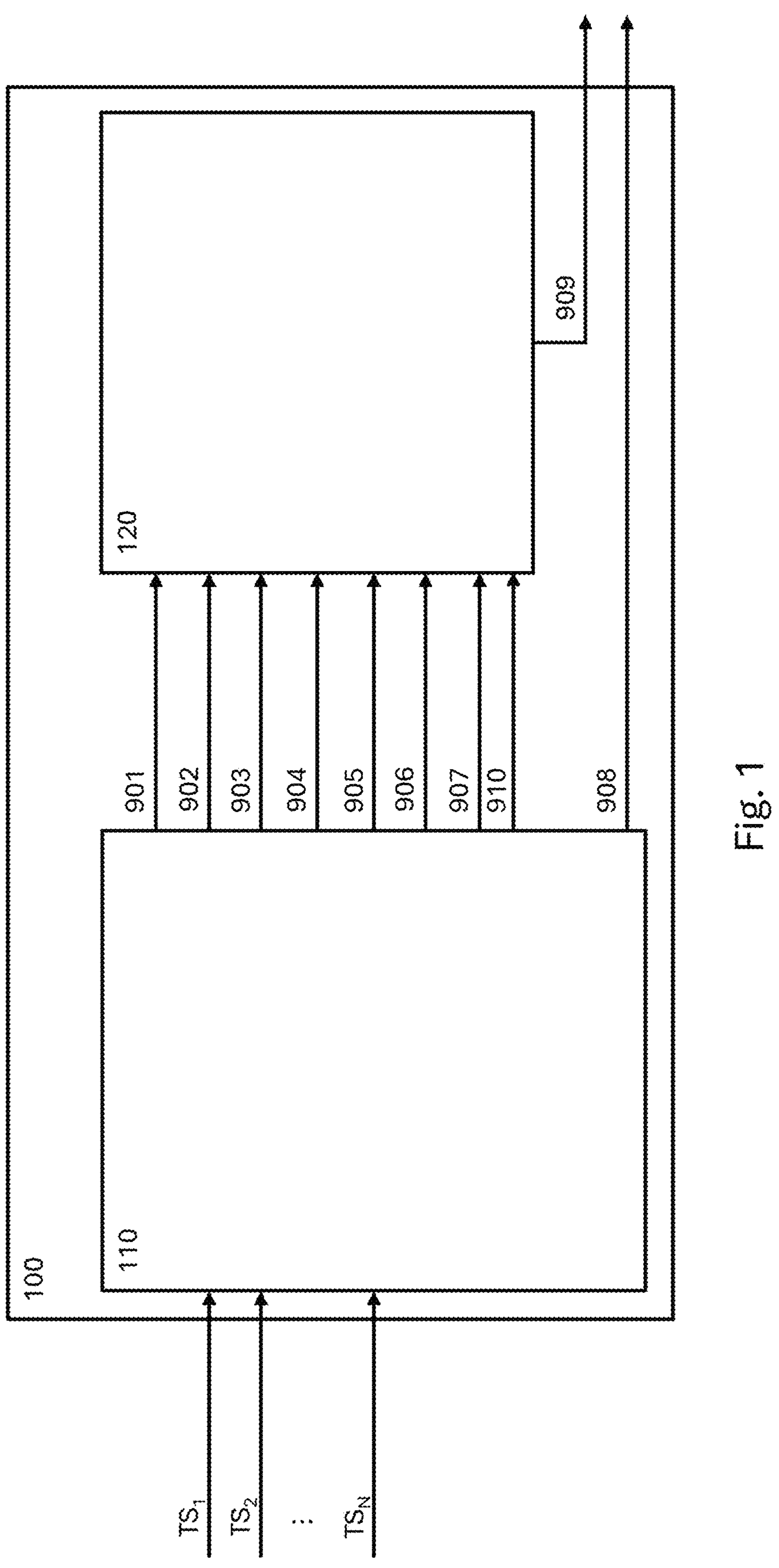

Currently, all automotive microcontrollers targeted for the higher automotive safety integrity level (ASIL) defined by the ISO26262 provide hardware support (e.g., a watchdog timer) to implement both logical and temporal flow monitoring. This watchdog timer generally supports both windowed mode and keyed service mode which allows reaching high effective monitoring, anyway, to insert control flow checkpoints with the adequate granularity to reach the requested diagnostic coverage is under application responsibility. As a result, the implementation of these specific software countermeasures needs a significant effort during the application design phase and high runtime computational load for the microcontroller i.e., it is proportional to the granularity of the control flow checkpoints.

SUMMARY

On the basis of the foregoing description, the need is felt for solutions which overcome one or more of the previously outlined drawbacks.

According to one or more embodiments, such an object is achieved through a circuit having the features specifically set forth in the claims that follow. Embodiments moreover concern a related method.

The claims are an integral part of the technical teaching of the disclosure provided herein.

As mentioned previously, various embodiments of the present disclosure regard a monitoring circuit for performing logical and temporal task monitoring of a plurality of tasks executed in a processing system, the monitoring circuit comprising:

- a task management circuit;
- a task recording circuit;
- the task management circuit receiving as input a plurality of task signals, each task signal being indicative of an execution state of a respective task, and comprising a managing circuit which is configured to operate in at least three modes depending on a respective event corresponding to either the detection of a rising edge or a falling edge of a given task signal in the plurality of task signals being monitored, or an occurrence of a trigger signal;
- in each mode the managing circuit being configured to check whether at least a variable representing the operation state of the task contains an expected value in correspondence of the occurrence of the event (enabling the respective mode, outputting a result of the check operation in an error signal for the given task being monitored.

In variant embodiments, the managing circuit is configured to check a variable indicating if the task is active or not active before of the occurrence of the event.

In variant embodiments, the managing circuit) is configured also to check a variable indicating the mode before of the occurrence of the event.

In variant embodiments, the task management circuit, in each of the at least three modes, is also configured to:

- store in a shared timestamp register a first timestamp value corresponding to the occurrence of the event;
- send a respective command for each respective mode determined by a respective event to the task recording circuit;
- store in a capture register a second timestamp value corresponding to the sending of the respective command for each respective mode determined by a respective event;
- send the first timestamp and second timestamp value to the task recording circuit;
- the task recording circuit comprising at least a table information structure comprising records storing the second timestamp values and storing the corresponding commands, each record corresponding to a first timestamp value;
- the task recording circuit being configured to compute for the given task being monitored, on the basis of the second timestamp values stored for the given task in correspondence of each one of the events, a duration of the given task being monitored, and to check whether the duration of the given task being monitored corresponds to a duration expected value or is comprised within a range of duration values, outputting a signal indicating error if the given task has duration different from the duration expected value or outside the range.

In variant embodiments, the error signal comprises a timestamp of the checking of the error and, in particular, also a type of error represented by an indication of the event under which the error is checked.

In variant embodiments, the task management circuit comprises a plurality of edge detector circuits, each edge detector circuit being coupled to a respective task signal, each edge detector circuit being configured to generate a detectable pulse signal, in particular having a duration of at least one clock cycle, on the rising edge and the falling edge of the corresponding task signal.

In variant embodiments, the task management circuit further comprises:

a free-running counter;

a counter capture register;

the counter capture register being configured to store values captured from the free-running counter corresponding to the time of occurrence of the events, in the plurality of tasks, in particular the free-running counter being reset upon detection of a rising edge of a task signal among the plurality of the task signals, in particular the rising edge of the given task signal being monitored.

In variant embodiments, the task management circuit further comprises:

a task reload selection register configured to store an identifier of the selected task signal being monitored among the plurality of task signals;

a task enable register configured to store a bit corresponding to each task signal of the plurality of task signals, the bit indicating whether a respective task signal is being monitored or not;

a task software trigger register being configured to store a plurality of bits corresponding to the plurality of task signals, a bit asserted in the plurality of bits determining the task manager to generate the software trigger signal a detectable pulse signal, in particular having a duration of at least one clock cycle, and in particular comprises also a task periodic register being configured to store a bit corresponding to each task signal of the plurality of task signals, the bit indicating whether a respective task signal is periodic i.e., has a rising edge occurring at regular intervals, or not.

In variant embodiments, the managing circuit comprises:

a timestamp counter;

a task number register storing a task number identifying which task signal is being monitored;

a shared task timestamp register is configured to store, the first timestamp of the timestamp counter;

a task error register configured to store, upon the occurrence of an error, the timestamp of the checking of the error and, in particular, also a type of error represented by an indication of the event under which the error is checked;

a plurality of task execution registers corresponding to respective task signals storing the variable representing the operation state of the task;

a plurality of task timestamp registers, each storing a value in the shared task timestamp register when the respective task signal is being monitored;

a plurality of task status registers storing a value representing the status for each task signal, the status corresponding to the command;

the managing circuit receiving as input the signals generated by the plurality of edge detector circuits, the data from the task reload selection register, the data from the task enable register, the data from the task periodic register and the data from the task software trigger register;

the managing circuit being configured to generate a set of output signals to the task recording circuit comprising the commands which comprises a start signal, a software trigger signal, a stop signal, and also a task number signal, a first and second timestamp signal task timestamp signals and a task error signal, the content of which depends on according to which of the at least three modes, depending on a respective event, the managing circuit is operating, and in particular the set of signals comprises also a periodic task signal and a reload signal.

In variant embodiments, in response to the detection of a rising edge of a task signal among the plurality of task signals, the managing circuit is configured to operate in first mode, and comprises, in the following order, the steps of:

checking whether a value stored in the task execution register is equal to an expected value in correspondence of the occurrence of the event enabling the respective mode, in the negative the outputting a result of the check operation in an error signal for the given task being monitored comprises issuing a task error signal comprising a timestamp of the checking of the error and, in particular, also a type of error represented by an indication of the event under which the error is checked;

writing in the task number register a value indicating which task signal among the plurality of task signals is being monitored;

reading a value stored in the timestamp counter and copying such value in the respective shared task timestamp register for the given task signal, increasing the value stored in the timestamp counter, in particular by 1;

writing in the task execution register the expected value in correspondence of the occurrence of the next expected event, in particular in particular writing a value equal to 1 corresponding to issuance of the trigger signal;

reading the value stored in the shared task timestamp register and copying such value in the task timestamp register of the given task signal;

writing in the task status register the command corresponding to the first mode, in particular a command indicative of the start of the task and generating a corresponding first mode command, which is received by the task recording circuit.

In variant embodiments, in response to the detection of a software trigger for a task signal among the plurality of task signals, the managing circuit is configured to operate in second mode, comprising, in the following order, the steps of:

checking whether a value stored in the task execution register is equal to an expected value in correspondence of the occurrence of the event enabling the respective mode, in the negative the outputting a result of the check operation in an error signal for the given task being monitored comprises issuing a task error signal comprising a timestamp of the checking of the error and, in particular, also a type of error represented by an indication of the event under which the error is checked;

writing in the task number register a value indicating which task signal among the plurality of task signals is being monitored;

reading a value stored in task timestamp register of the given task signal and copying such value in the respective shared task timestamp register for the given task signal;

writing in the task execution register the expected value in correspondence of the occurrence of the next expected event, in particular writing a value equal to 2 corresponding to the issuance of the falling edge signal;

writing in the task status register the command corresponding to the second mode, in particular a command indicative of an ongoing task; and generating a corresponding second mode command, which is received by the task recording circuit.

In variant embodiments, in response to the detection of a falling edge for a task signal among the plurality of task signals, the managing circuit is configured to operate in third mode, comprising, in the following order, the steps of:

checking whether a value stored in the task execution register is equal to an expected value in correspondence of the occurrence of the event enabling the respective mode, in the negative the outputting a result of the check operation in an error signal for the given task being monitored comprises issuing a task error signal comprising a timestamp of the checking of the error and, in particular, also a type of error represented by an indication of the event under which the error is checked;

writing in the task number register a value indicating which task signal among the plurality of task signals is being monitored;

reading a value stored in task timestamp register of the given task signal and copying such value in the respective shared task timestamp register for the given task signal;

writing in the task execution register the expected value in correspondence of the occurrence of the next expected event, in particular writing a value equal to 0 corresponding to the issuance of the rising edge signal;

writing in the task status register the command corresponding to the third mode, in particular a command indicative of a stop of the task; and generating a corresponding third mode command, which is received by the task recording circuit.

In variant embodiments, the task recording circuit is configured to perform, in response to detecting an occurrence of one of the commands, in particular either a start signal, a software trigger signal or a stop signal in the following order, the steps of:

reading the task timestamp signal and selecting a record among the plurality of records according to the value of such task timestamp signal;

reading the value stored in the counter capture register and copying such value in either the task start time, task latency time or task stop time according to the detected command;

writing in the task status field of the record selected previously a value representative of whether a start signal, a software trigger signal or a stop signal occurrence is detected.

In variant embodiments, the first, second and third modes of operation further comprise a step of checking whether a bit, stored in the task enable register is asserted, in the positive proceeding to next step and, in the negative, terminating the execution of such first, second or third operation mode.

In variant embodiments, the first, second and third modes of operation further comprise a step of reading a bit stored in the task periodic register and producing as output the task periodic signal, being asserted if the bit is asserted and being de-asserted if the bit is de-asserted, and the table information structure comprising records storing the second timestamp values and storing the command, each record corresponding to a first timestamp value comprises a periodic tasks table and a non-periodic tasks table, both comprising records storing the second timestamp values and storing the command, each record corresponding to a first timestamp value, the storing being performed in the periodic tasks table or in the non-periodic tasks table depending on the bit stored in the task periodic register being asserted or not respectively, the recording circuit being configured to read the periodic task signal and selecting the periodic tasks table or the non-periodic tasks table according to the value of such periodic task signal.

In variant embodiments, the first mode of operation further comprises the steps of:

checking whether a value, stored in the task reload selection register and being associated to a given task signal, is associated to the task signal being monitored; and in the positive, generating a reload signal being received by the timestamp counter to reset the value stored therein;

in the negative, proceeding to next step.

In variant embodiments, the third mode of operation further comprises a step of resetting the task timestamp register to a default value, in particular the default value being equal to zero.

In variant embodiments, the task recording circuit further comprises a record checking sub-circuit configured to perform, in response to detecting an occurrence of a stop signal, in the following order, the steps of:

comparing the task number of the record corresponding to the occurrence of the stop signal to an expected task number;

computing a task duration, as the difference between the task stop time and the task start time, of the record corresponding to the occurrence of the stop signal;

comparing the task duration to an expected task duration and/or to a minimum threshold value and to a maximum threshold value;

outputting a signal indicating error if the given task has duration different from the duration expected value or outside the range upon detecting that the task duration is smaller than the minimum threshold value or greater than the maximum threshold value, generating a task record error message.

The solution here described relates also to a method for performing logical and temporal task monitoring of a plurality of tasks executed in a processing system, the method comprising the operations performed by the circuit according to embodiments.

BRIEF DESCRIPTION OF THE DRAWINGS

Figure 2:
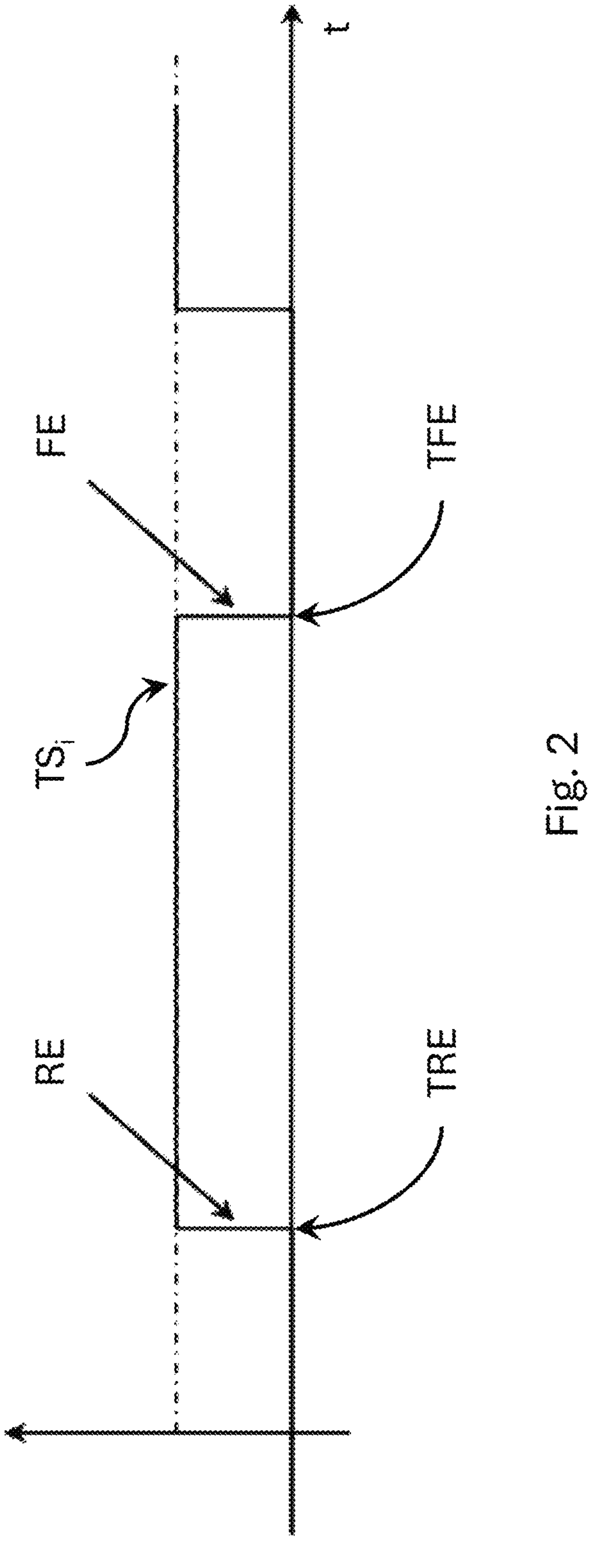
Figure 3:
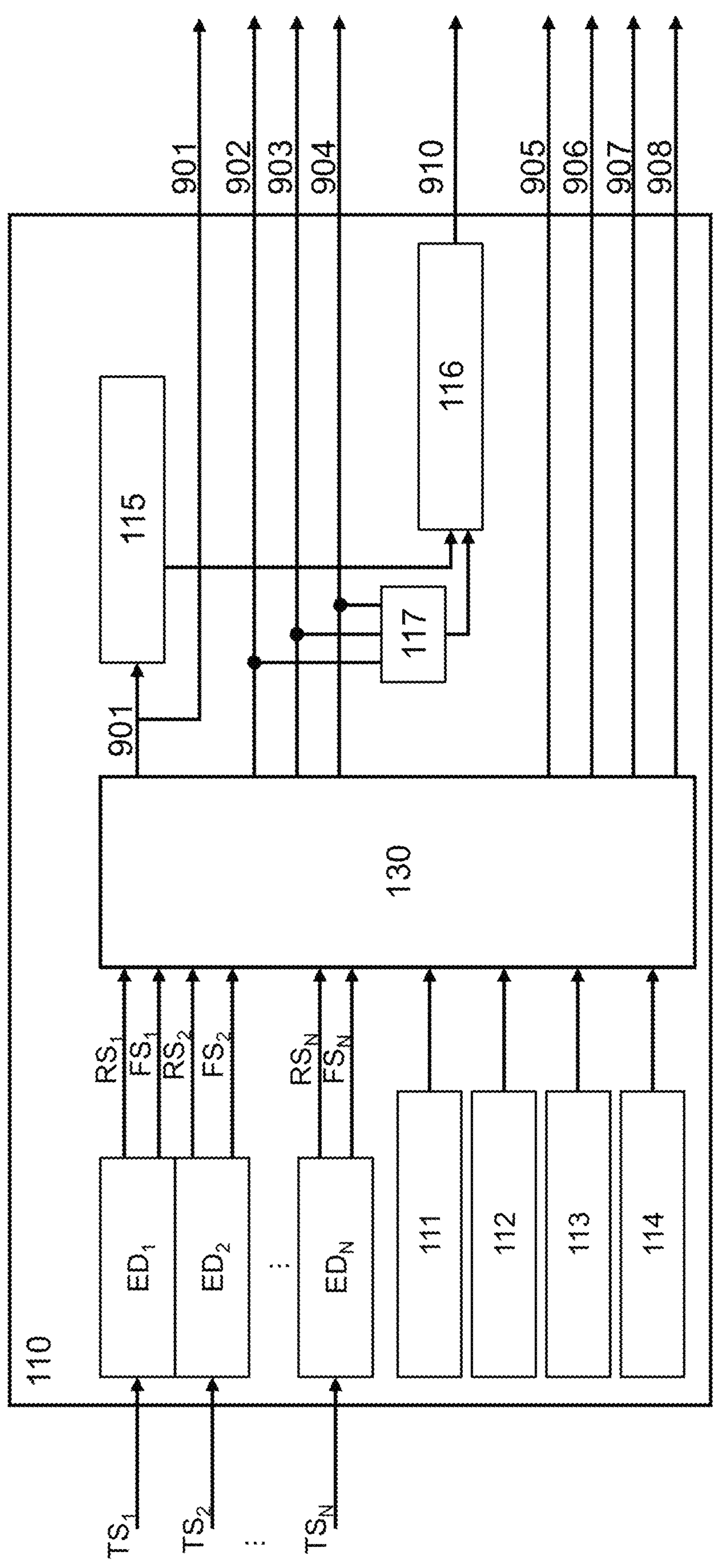
Figure 4:
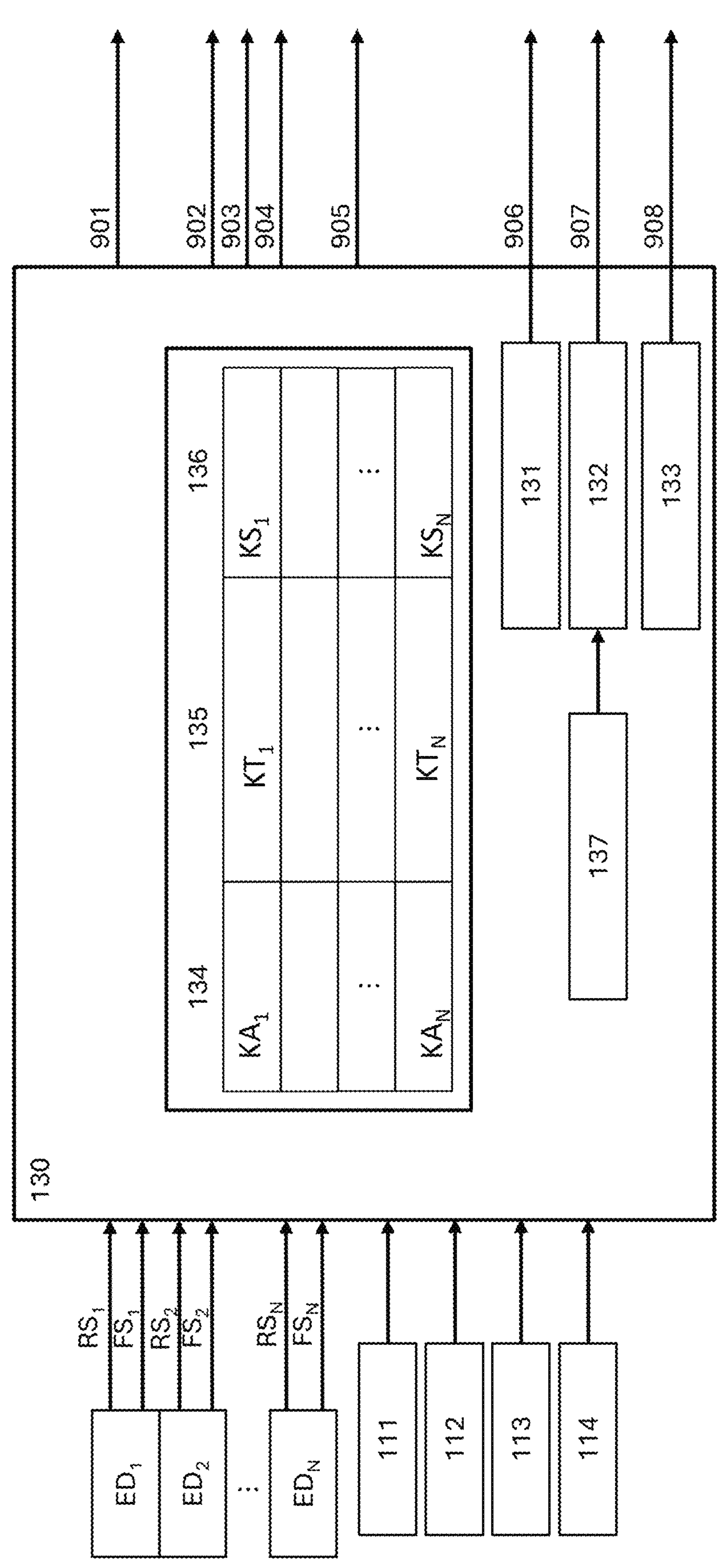
Figure 5:
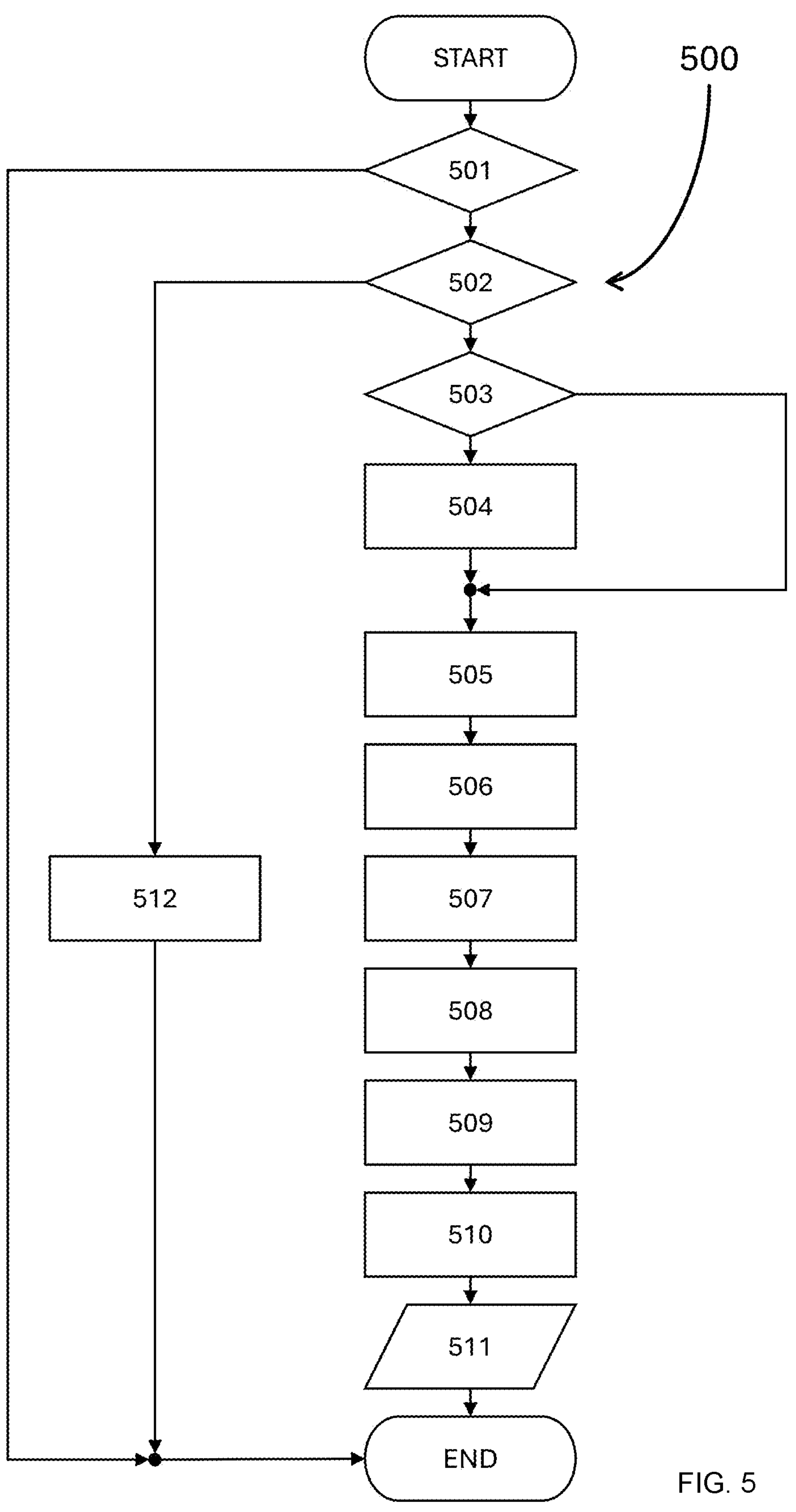
Figure 6:
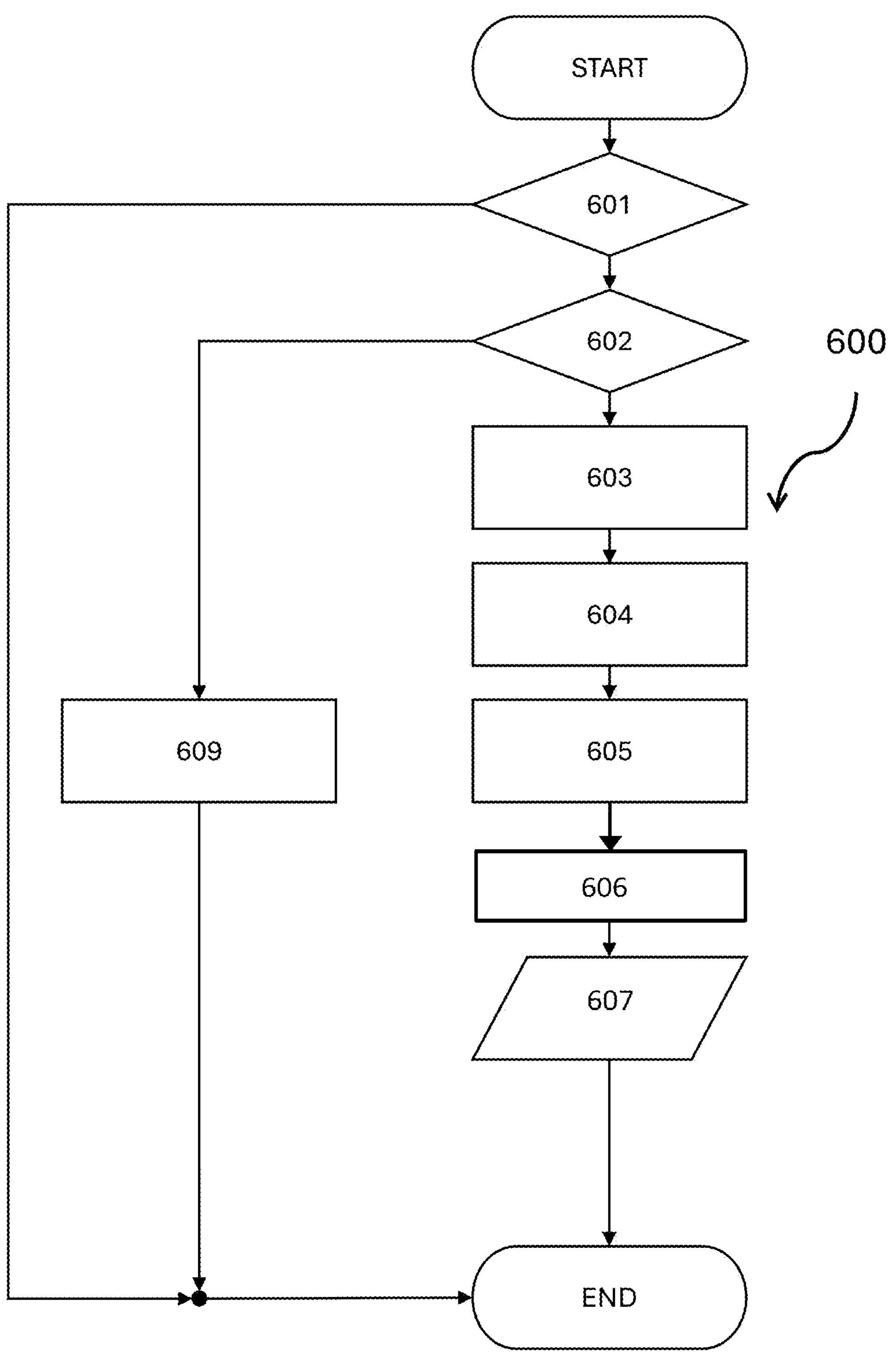
Figure 7:
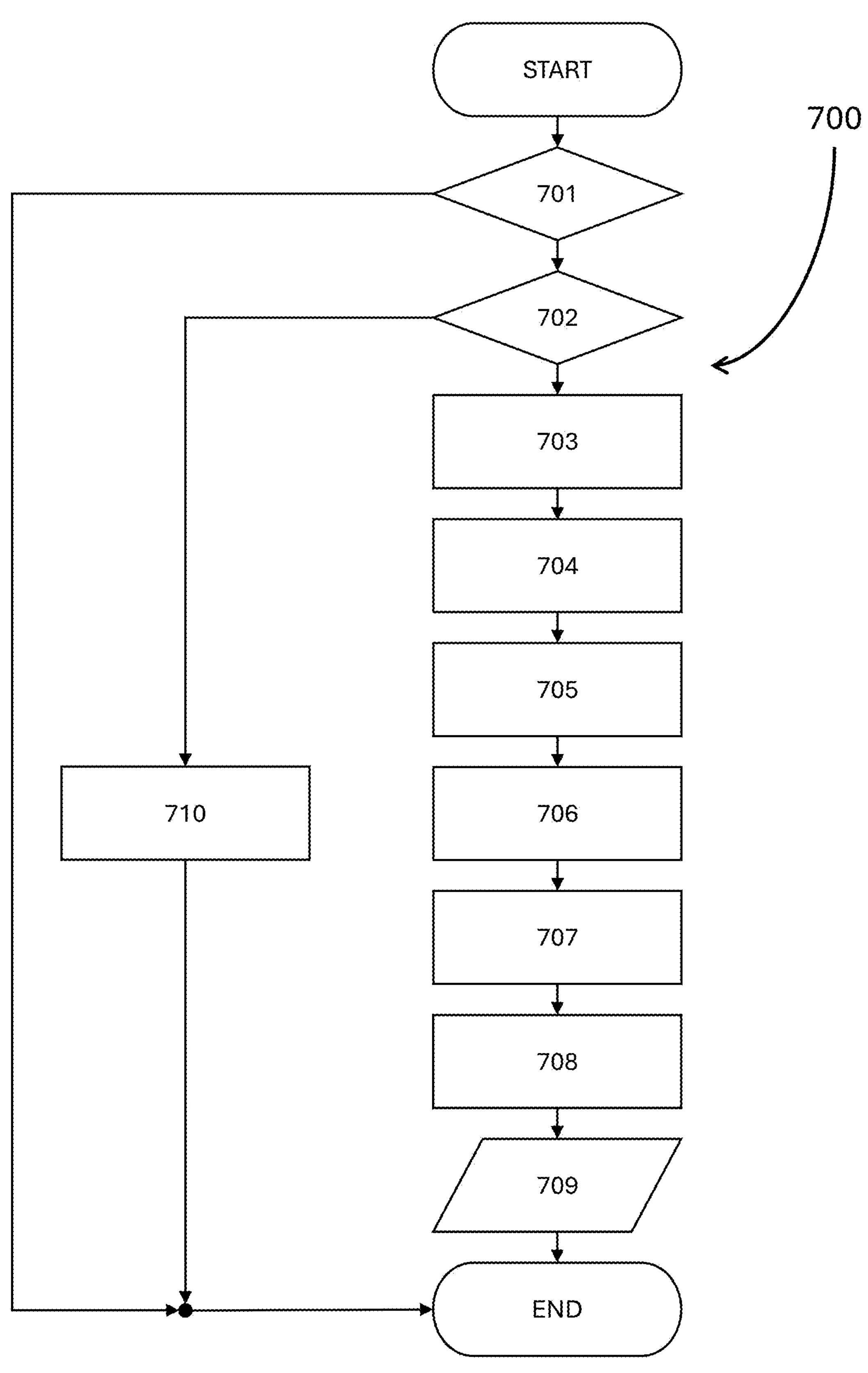
Figure 8:
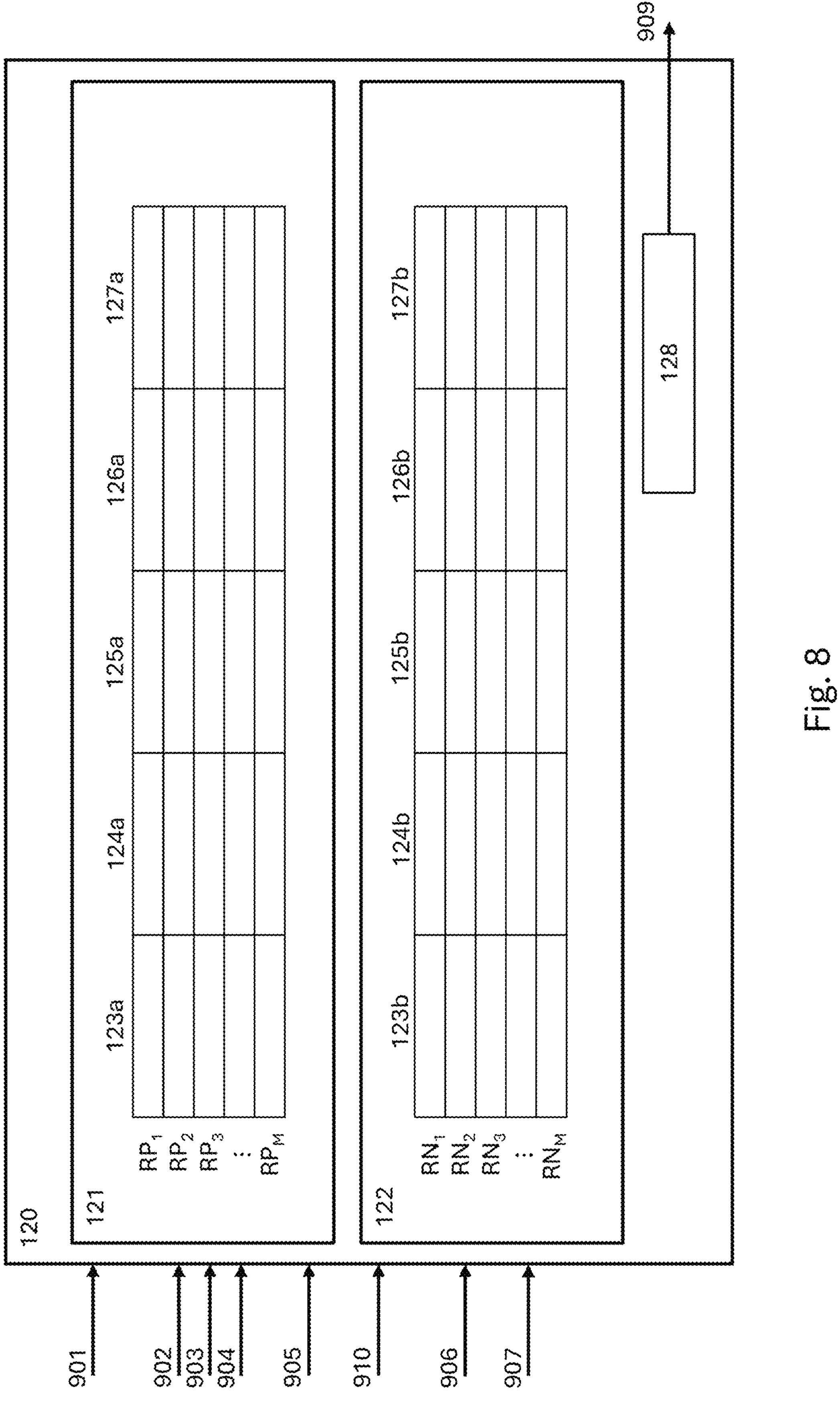

Embodiments of the present disclosure will now be described with reference to the annexed drawings, which are provided purely by way of non-limiting example and in which:

FIG. 1 shows a block diagram representing a circuit for logical and temporal task monitoring according to an embodiment of the present solution;

FIG. 2 shows a plot representing an example of task signal according to an embodiment of the present solution;

FIG. 3 shows a block diagram representing a task management circuit according to an embodiment of the present solution;

FIG. 4 shows a block diagram representing a signal manager circuit according to an embodiment of the present solution;

FIG. 5 shows a flowchart representing a method performed by the signal manager circuit upon the detection of a rising edge signal;

FIG. 6 shows a flowchart representing a method performed by the signal manager circuit upon the detection of a software trigger signal;

FIG. 7 shows a flowchart representing a method performed by the signal manager circuit upon the detection of a falling edge signal; and FIG. 8 shows a block diagram representing a task recording circuit according to an embodiment of the present solution.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figures parts, elements or components which have already been described with reference to previous figures are denoted by the same references previously used in such figures; the description of such previously described elements will not be repeated in the following in order not to overburden the present detailed description.

The solution here described refers to a circuit for logical and temporal task monitoring in a processing system and a corresponding method.

In this regard, in FIG. 1 an exemplary embodiment of the present solution is shown. A circuit for logical and temporal task monitoring 100 comprises two sub-circuits, namely a task management circuit 110 and a task recording circuit 120. Such task monitor circuit 100 receives as input a plurality of task signals $TS_1 \ldots TS_N$, with N being the total number of tasks supported by the circuit, indicating the execution state of a respective task being executed in an external processing system, and produces as output two signals, respectively a task error signal 908 and a task record error 909.

FIG. 2 shows a time diagram representing a detailed example of a task signal $TS_i$ as a function of time t. Each task signal $TS_1 \ldots TS_N$ is a two-level signal being asserted when a request to execute a task occurs on a request execution time TRE, causing a rising edge RE in the task signal $TS_i$. The signal $TS_i$ keeps a high value for the entire duration of the task execution and is de-asserted as soon as the task execution ends at an end execution time TFE, causing a falling edge FE in the task signal $TS_i$.

In FIG. 3 a detailed block diagram of the task management circuit 110 is illustrated. Such task management circuit 110 receives as input the plurality of task signals $TS_1 \ldots TS_N$, and produces as output a reload signal 901, a start signal 902, a software trigger signal 903, a stop signal 904, a periodic task signal 905, a task number 906, a first timestamp, i.e., a task timestamp or task event timestamp 907, a task error signal 908 and a counter capture signal 910. The task management circuit 110 comprises a plurality of edge detector circuits $ED_1 \ldots ED_N$, respectively coupled to the plurality of task signals $TS_1 \ldots TS_N$, a task reload selection register 111, a task enable register 112, a task periodic register 113, a task software trigger register 114, a free-running counter 115, a counter capture register 116, an OR gate 117 and a signal manager circuit 130.

Each edge detector circuit ED; is configured to generate detectable pulse signals i.e., pulse signals having a duration of at least one full clock cycle, when a rising edge or a falling edge is detected on the corresponding input signal $TS_i$. Upon the detection of a rising edge on the input signal $TS_i$, the edge detector circuit ED; generates a rising edge signal $RS_i$, whereas upon the detection of a falling edge on the input signal $TS_i$, the edge detector circuit $ED_i$ generates a falling edge signal $FS_i$.

The task reload selection register 111 is configured to store a value pointing to a task signal $TS_i$ among the plurality of task signals $TS_1 \ldots TS_N$, in such a way that a user can select a specific task signal $TS_i$ e.g., by storing in such task reload selection register 111 a value pointing to the task signal $TS_i$, for triggering the assertion of a reload signal 901 sent to the free-running counter 115. The value stored in the task reload selection register 111 is accessible by the signal manager circuit 130, to which the task reload selection register 111 is connected. In particular, in order to store the value pointing to any of the received task signals $TS_1 \ldots TS_N$, the task reload selection register 111 comprises a number of bits equal to the binary logarithm of the total number of received task signals N.

Furthermore, as the task signals are numbered starting from 1, it is necessary to store a value x−1 in the task reload selection register 111 to select a task $TS_x$ for generating the counter reload signal. Thus, for example, if a user desires to select the task signal $TS_3$ to trigger the reload of the counter upon the occurrence of a rising edge, it stores in the task reload selection register 111 a value 3−1=2 in order to point correctly at the desired task signal.

The task enable register 112 is configured to store N bits, N being the number of received task signals, which are respectively coupled to corresponding task signals in the plurality of task signals $TS_1 \ldots TS_N$, in such a way that each bit of such task enable register 112 is coupled to one, and only one, task signal $TS_i$. Each bit is indicative of whether the monitoring of a respective task signal is enabled or not. The values stored in the task enable register 112 are accessible by the signal manager circuit 130, to which the task enable register 112 is connected. Thus, for example, if a user desires to enable the monitoring of task signal $TS_3$, it asserts the corresponding bit in the task enable register 112 e.g., the bit occupying the third position in such register. Conversely, in order to disable the monitoring of a task, the respective bit in the task enable register 112 is de-asserted.

The task periodic register 113 is configured to store N bits, N being the number of received task signals, which are respectively coupled to corresponding task signals in the plurality of task signals $TS_1 \ldots TS_N$, in such a way that each bit of such task periodic register 113 is coupled to one, and only one, task signal $TS_i$. Each bit is indicative of whether a respective task signal is periodic i.e., the task signal rising edge occurs at regular time intervals, or not. The values stored in the task periodic register 113 are accessible by the signal manager circuit 130, to which the task periodic register 113 is connected. Thus, for example, if a user desires to declare task signal $TS_3$ as periodic, it asserts the corresponding bit in the task periodic register 113 e.g., the bit occupying the third position in such register. Conversely, in order to declare a task as non-periodic, the respective bit in the task periodic register 113 is de-asserted.

The task software trigger register 114 is configured to store N bits, N being the number of received task signals, which are respectively coupled to corresponding task signals in the plurality of task signals $TS_1 \ldots TS_N$, in such a way that each bit of such task software trigger register 114 is coupled to one, and only one, task signal $TS_i$. Each bit is indicative of whether a software trigger signal 903, associated to the respective task signal $TS_i$, is to be generated by the signal manager circuit 130 during the upcoming clock cycle or not. The values stored in the task software trigger register 114 are accessible by the signal manager circuit 130, to which the task software trigger register 114 is connected. Specifically, since each task signal of the plurality of task signals $TS_1 \ldots TS_N$ is associated to one bit of the task software trigger register 114, it is possible to generate software trigger signals individually for each task $TS_i$. Furthermore, the task software trigger register 114 is self-clearing i.e., it is configured to reset its content after a fixed number of clock cycles. Thus, for example, if a user desires to generate a software trigger signal 903 associated to the task $TS_3$, it includes an instruction to assert the corresponding bit in the task software trigger register 114 e.g., the bit occupying the third position in such register, at the desired position in the source code of task $TS_3$. After asserting such bit in the task software trigger register 114, the software trigger signal 903 associated to the desired task is generated and, successively, the content of the task software trigger register 114 is automatically cleared.

The free-running counter 115 circuit is configured as a timer and, upon the reception of a reload signal 901, is configured to reset its value. The reload signal 901 is a pulse signal with a detectable duration i.e., a duration of at least one full clock cycle, and its purpose is thus to define the time windows for monitoring the tasks.

The counter capture register 116 is configured to capture the value of the free-running counter 115 on the occurrence of either a start signal 902, a software trigger signal 903 or a stop signal 904. To this end, the OR gate 117 receives as input signals the start signal 902, the software trigger signal 903 and the stop signal 904, and produces as output a signal containing the result of an OR operation between the input signals 902, 903 and 904. The output signal produced by the OR gate 117 is received by the counter capture register 116 that, concurrently with the reception of an asserted signal, captures the value stored in the free-running counter 115. Consequently, the counter capture register 116 stores for each monitored task the time of occurrence of the execution request, the starting time of the execution and the stopping time of the execution, referred to the starting time of the monitoring window. The data saved, which may correspond to a second timestamp value, or task timing timestamp value, corresponding to one of start signal 902, the software trigger signal 903 and the stop signal 904 being asserted, in the counter capture register 116 is transferred to the other components by means of a counter capture signal 910. It is underlined that in variant embodiments the counter capture register 116 may store two or three second timestamps, corresponding to the occurrence (e.g., signal going high level) of the start signal 902 and stop signal 904, or to the occurrence of the start signal 902, a software trigger signal 903 or a stop signal 904 respectively and send them at the same time in the capture signal 910, i.e., storing them at the same time in the recording circuit.

The signal manager circuit 130 receives as input the rising edge and falling edge signals $RS_i$, $FS_i$ originating from the plurality of edge detector circuits $ED_1 \ldots ED_N$ and the data stored in the task reload selection register 111, the task enable register 112, the task periodic register 113 and the task software trigger register 114.

The signal manager circuit, or managing circuit, 130 produces as output a reload signal 901, which is received by the free-running counter 115, a start signal 902, a software trigger signal 903, a stop signal 904, a periodic task signal 905, a task number 906, a task event timestamp 907 and a task error signal 908.

In FIG. 4, a detailed block diagram of the signal manager circuit 130 is illustrated.

The signal manager circuit 130 comprises a task number register 131, a timestamp register 132, a task error register 133, then it comprises a group of registers assigned one to each task signal, namely a plurality of task execution registers 134, one for each task signal, i.e., N registers, a plurality of task timestamp register 135, one for each task signal and a plurality of task status register 136, one for each task signal. Furthermore, the signal manager circuit 130 comprises a timestamp counter 137.

In particular, the task number register 131 is configured to store a task number identifying which task signal $TS_i$ among the plurality of task signals $TS_1 \ldots TS_N$ is being processed, and its content is carried by the task number signal 906. The task timestamp register 132 is configured to store, upon the occurrence of an event, in particular detection of a rising edge $RS_i$, issuance of a software trigger signal 114, detection of a falling edge $FS_i$, as better detailed in the following, the value of the timestamp counter 137 and its content is carried by the task timestamp signal 907, i.e., a first timestamp signal. The task error register 133 is configured to store, upon the occurrence of an error, information such as the type of error, the number i of the task $TS_i$ generating the error and the relevant timestamp.

The task execution register 134 is configured to store information for further processing associated to each task signal $TS_i$, representing whether the task $TS_i$ is currently in execution or not, thus it is capable of storing N values, N being the total number of monitored tasks. The number of bits necessary to store such values may vary according to the considered embodiment.

The task timestamp register 135 is configured to store a timestamp value $KT_i$, referred to the timestamp counter 137, associated to each task signal $TS_i$, whose value represents the position of the task in the execution sequence. Similar to the task execution register 134, such task timestamp register 135 is capable of storing N values, N being the total number of monitored tasks.

The plurality of task status registers 136 is configured to store a value representing the status for each task $TS_i$ in the plurality of task signals $TS_1 \ldots TS_N$. Thus, similar to the aforementioned registers 134 and 135, such task status register 136 is capable of storing N values, N being the total number of monitored tasks.

Such signal manager circuit 130 is configured to read the values stored in the connected registers and receive the rising edge and falling edge signals originating from the plurality of edge detector circuits $ED_1 \ldots ED_N$, and to produce the aforementioned output signals which are then sent to the task recording circuit 120.

The task signal manager 130 is configured to perform different instructions according to the input signals received. Specifically, the task signal manager 130 implements different methods upon the detection of three different events: the reception of a rising edge signal $RS_i$ from the plurality of edge detector circuits $ED_1 \ldots ED_N$, the detection of an asserted bit in the task software trigger register 114, and the reception of a falling edge signal $FS_i$ from the plurality of edge detector circuits $ED_1 \ldots ED_N$.

In FIG. 5 a flowchart representing a method 500, corresponding an embodiment of a first mode of operation of the task manager, executed upon the reception of a rising edge signal $RS_i$ from the plurality of edge detector circuits $ED_1 \ldots ED_N$, namely originating from an edge detector circuit $ED_i$, is shown. At the beginning and at the end of the flowchart the conventional START block and END block are shown, here and also in FIGS. 6 and 7.

In a first step 501, the signal manager circuit 130 checks whether a bit $BE_i$, stored in the task enable register 112 and associated to the edge detector circuit $ED_i$, is asserted. If the bit BE; is asserted i.e., the monitoring of task $TS_i$ is enabled, the signal manager circuit 130 proceeds to step 502.

In step 502, the signal manager circuit 130 checks whether a value $KA_i$, stored in the task execution register 134 and associated to the edge detector circuit $ED_i$, being indicative of whether an associated task $TS_i$ is in execution or not, is equal to 0. If the value $KA_i$ is not equal to 0, the signal manager circuit 130 skips to a step 512, where a task error signal 908, containing the relevant information such as the number of the task causing the error, type of error and relevant timestamp, respectively stored in registers 134, 135, 136 of the signal manager circuit 130, is generated, then the execution of method 500 ends.

Conversely, if the value $KA_i$ is equal to 0, the signal manager circuit 130 proceeds to step 503.

Thus, in summary, the task execution register 134 stores a value $KA_i$ representing whether the task $TS_i$ is currently in execution or not.

In step 503, the signal manager circuit 130 checks whether a value KR, stored in the task reload selection register 111 is associated to the task signal $TS_i$, indicating that the generation of the reload signal 901 is triggered by the rising edge of the task signal $TS_i$. If so, the signal manager circuit 130 proceeds to step 504, in which a reload signal 901 is generated and the internal timestamp counter 137 is reset. Conversely, if the value stored in the task reload selection register 111 refers to a task signal different from task signal $TS_i$, the signal manager circuit 130 proceeds to a step 505.

In step 505, the signal manager circuit 130 reads a bit $BP_i$, stored in the task periodic register 113 and associated to the edge detector circuit $ED_i$, and produces as output the task periodic signal 905, being asserted if the bit $BP_i$ is asserted and, vice-versa, being de-asserted if the bit $BP_i$ is de-asserted.

Successively, in a step 506, the signal manager circuit 130 writes in the task number register 131 a value indicating which task signal $TS_i$ among the plurality of task signals $TS_1 \ldots TS_N$ is being processed. Thus, for example, if a rising edge signal $RS_3$ of a task signal $TS_3$ causes the signal manager circuit 130 to execute the method 500, a value equal to 3 is stored in the task number register 131 after such step 506.

Successively, in a step 507, the signal manager circuit 130 reads the value stored in the timestamp counter 137 and copies such value in the task timestamp register 132. Furthermore, the value stored in the timestamp counter 137 is increased by 1.

Successively, in a step 508, the signal manager circuit 130 writes to 1 the value $KA_i$ in the task execution register 134. This step prevents the signal manager circuit 130 from entering the same branch of method 500, in particular at step 502, and prepares the signal manager circuit 130 to the execution of methods corresponding to the detection of software trigger signals or falling edges, that will be further described in the foregoing.

Successively, in a step 509, the signal manager circuit 130 reads the value stored in the task timestamp register 132 and copies such value in the task timestamp register 135.

Successively, in a step 510, the signal manager circuit 130 writes the value $KS_i$ in the task status register 136 to the value "START", which represent the command, in particular for the recording circuit 120, issued in the first mode, i.e., a first mode command. In various embodiments, such value "START" can be represented using a smaller number of bits by using, for instance, the value 1. As better detailed in the following $KS_i$ may take three values in sequence, each representing an expected value depending on the previous mode and the current mode, i.e., in this case first mode 500, which follows a last detection of a falling edge (third mode 700, as described below), the expected value of $KS_i$ is 0 and the current value is set to 1.

Finally, in a step 511, the signal manager circuit 130 generates a start signal 902, which is received by the task recording circuit 120, then the execution of method 500 ends.

It is here underlined that in embodiments the procedure 500 corresponding to the first mode of operation may be limited substantially to operation 502 and 506 to 511, the other operations 501, 503-505 may be optionally present.

Similarly, in FIG. 6 a flowchart representing a method 600, corresponding to an embodiment of a second mode of operation of the task manager 110, executed upon the reception of a software trigger signal, is shown. This method 600 corresponds to a second mode of operation of the circuit, in particular of the task manager and of the recorder.

In a first step 601, the signal manager circuit 130 checks whether a bit $BE_i$, stored in the task enable register 112 and associated to the edge detector circuit $ED_i$, is asserted. If the bit $BE_i$ is asserted i.e., the monitoring of task $TS_i$ is enabled, the signal manager circuit 130 proceeds to step 602.

In step 602, the signal manager circuit 130 checks whether a value $KA_i$, stored in the task execution register 134 and associated to the edge detector circuit $ED_i$, is equal to 1. If the value $KA_i$ is not equal to 1, the signal manager circuit 130 skips to a step 609, where a task error signal 908, containing the relevant information such as the number of the task causing the error, type of error and relevant timestamp, respectively stored in registers 134, 135, 136 of the signal manager circuit 130, is generated, then the execution of method 600 ends.

Conversely, if the value $KA_i$ is equal to 1, the signal manager circuit 130 proceeds to step 603.

In step 603, the signal manager circuit 130 reads a bit $BP_i$, stored in the task periodic register 113 and associated to the edge detector circuit $ED_i$, and produces as output the task periodic signal 905, being asserted if the bit $BP_i$ is asserted and, vice-versa, being de-asserted if the bit $BP_i$ is de-asserted.

Successively, in a step 604, the signal manager circuit 130 writes in the task number register 131 a value indicating which task signal $TS_i$ among the plurality of task signals $TS_1 \ldots TS_N$ is being processed. Thus, for example, if a software trigger originating from a task signal $TS_3$ causes the signal manager circuit 130 to execute the method 600, a value equal to 3 is stored in the task number register 131 after such step 604.

Successively, in a step 605, the signal manager circuit 130 reads the value stored in the timestamp counter 137 and copies such value in the task timestamp register 132.

The signal manager circuit 130 in this phase maintains the value 1 in the task execution register 134 to indicate that the task is still on.

Subsequently, in a step 606, the signal manager circuit 130 writes in the task status register 136 the value "ONGOING". In various embodiments, such value "ONGOING" can be represented using a smaller number of bits by using, for instance, the value 2.

Finally, in a step 607, the signal manager circuit 130 generates a software trigger signal 903, which is received by the task recording circuit 120, then the execution of method 600 ends.

It is here underlined that in embodiments the procedure 600 corresponding to the second mode of operation may be limited substantially to operations 604-607, the other operations 601, 603 may be optionally present.

Similarly, in FIG. 7 a flowchart representing a method 700, corresponding to an embodiment of a third mode of operation of the task manager 110, executed upon the reception of a falling edge signal from the plurality of edge detector circuits $ED_1 \ldots ED_N$, namely originating from an edge detector circuit $ED_i$, is shown.

In a first step 701, the signal manager circuit 130 checks whether a bit $BE_i$, stored in the task enable register 112 and associated to the edge detector circuit $ED_i$, is asserted. If the bit BE; is asserted i.e., the monitoring of task $TS_i$ is enabled, the signal manager circuit 130 proceeds to step 702.

In step 702, the signal manager circuit 130 checks whether a value $KA_i$, stored in the task execution register 134 and associated to the edge detector circuit $ED_i$, is equal to 1. If the value $KA_i$ is not equal to 1, the signal manager circuit 130 skips to a step 710, where a task error signal 908, containing the relevant information such as the number of the task causing the error, type of error and relevant timestamp, respectively stored in registers 134, 135, 136 of the signal manager circuit 130, is generated, then the execution of method 700 ends.

Conversely, if the value $KS_i$ is equal to 1, the signal manager circuit 130 proceeds to step 703.

In step 703, the signal manager circuit 130 reads a bit $BP_i$, stored in the task periodic register 113 and associated to the edge detector circuit $ED_i$, and produces as output the task periodic signal 905, being asserted if the bit BP; is asserted and, vice-versa, being de-asserted if the bit BP; is de-asserted.

Successively, in a step 704, the signal manager circuit 130 writes in the task number register 131 a value indicating which task signal $TS_i$ among the plurality of task signals $TS_1 \ldots TS_N$ is being processed. Thus, for example, if a falling edge signal $FS_3$ of a task signal $TS_3$ causes the signal manager circuit 130 to execute the method 700, a value equal to 3 is stored in the task number register 131 after such step 704.

Successively, in a step 705, the signal manager circuit 130 reads the value stored in the timestamp counter 137 and copies such value in the task timestamp register 132.

Successively, in a step 706, the signal manager circuit 130 writes a value equal to 0 in the task execution register 134. This step prevents the signal manager circuit 130 from entering the same branch of method 700, in particular at step 702, and prepares the signal manager circuit 130 to the execution of method 500 corresponding to the detection of a new rising edge on the monitored task signals $TS_1 \ldots TS_N$.

Optionally, in a step 707, the signal manager circuit 130 resets the task timestamp register 135 to a default value, 0 for example.

Successively, in a step 708, the signal manager circuit 130 writes in the task status register 136 the value "STOP". In various embodiments, such value "STOP" can be represented using a smaller number of bits by using, for instance, the value 0.

Finally, in a step 709, the signal manager circuit 130 generates a stop signal 904, which is received by the task recording circuit 120, then the execution of method 700 ends.

It is here underlined that in embodiments the procedure 700 corresponding to the third mode of operation may be limited substantially to operations 702, 704-706, 708, 709, the other operations 701, 703, 707 may be optionally present.

In FIG. 8 a detailed block diagram of the task recording circuit 120 is illustrated. Such task recording circuit 120 receives as input the reload signal 901, the start signal 902, the software trigger signal 903, the stop signal 904, the periodic task signal 905, the task number 906, the task event timestamp 907 and the counter capture signal 910, and produces as output a task record error 909. The task recording circuit 120 is configured to store the data provided by the task management circuit 110. To this end, the task recording circuit 120 comprises two tables: a periodic tasks table 121 and a non-periodic tasks table 122. The periodic tasks table 121 comprises a number M of rows $RP_1 \ldots RP_M$, each row $RP_j$ being associated to a record with a specific timestamp, generated by the task management circuit 110, and comprising the following fields: a task number 123*a*, a task start time 124*a*, a task latency time 125*a*, a task stop time 126*a* and a task status 127*a*. Similarly, the non-periodic tasks table 122 comprises a number M of rows $RN_1 \ldots RN_M$, each row $RN_j$ being associated to a record with a specific timestamp, generated by the task management circuit 110, and comprising a task number 123*b*, a task start time 124*b*, a task latency time 125*b*, a task stop time 126*b* and a task status 127*b*. Furthermore, the task recording circuit 120 comprises a record checking sub-circuit 128.

It is specified here that here for table is intended a structure of records with a plurality of fields, in the example task number 123*b*, task start time 124*b*, task latency time 125*b*, task stop time 126*b* and task status 127*b*, while each record, i.e., rows $RN_1 \ldots RN_M$, is indexed by the timestamp 907.

Upon the reception of a reload signal 901, the task recording circuit is configured to clear the content of both the periodic tasks table 121 and the non-periodic tasks table 122. As anticipated, the task recording circuit is configured to store the data coming from the task management circuit 110. In particular, such task recording circuit 120 implements three different methods, which are executed upon the reception of, respectively, a start signal 902, a software trigger signal 903 or a stop signal 904.

Specifically, on the occurrence of a start signal 902, the task recording circuit 120 reads the periodic task signal 905 and selects the table to save the data accordingly i.e., selects the periodic tasks table 121 if the periodic task signal 905 is asserted or, on the contrary, the non-periodic tasks table 122 if the periodic task signal 905 is de-asserted.

Successively, the task timestamp signal 907 is read in order to select the proper record of the selected table i.e., the correct record $RP_j$ or $RN_j$ according to a chronological order. After the record is selected, the task number signal 906 is read and copied in the corresponding task number field, 123*a* or 123*b* according to the table selected, then the task recording circuit 120 writes in the task start time field, 124*a* or 124*b* according to the table selected, the value read from the counter capture signal 910. Then, finally, in the task status field, 127*a* or 127*b* according to the table selected, the value "START", which can be, for instance, represented with a value equal to 1, is written.

Similarly, on the occurrence of a software trigger signal 903, the task recording circuit 120 reads the periodic task signal 905 and selects the table to save the data accordingly i.e., selects the periodic tasks table 121 if the periodic task signal 905 is asserted or, on the contrary, the non-periodic tasks table 122 if the periodic task signal 905 is de-asserted.

Successively, the task timestamp signal 907 is read in order to select the proper record of the selected table i.e., the correct row $RP_j$ or $RN_j$ according to a chronological order. After the record is selected, the task number signal 906 is read and copied in the corresponding task number field, 123*a* or 123*b* according to the table selected, then the task recording circuit 120 writes in the task latency time field, 125*a* or 125*b* according to the table selected, the value read from the counter capture signal 910. Then, finally, in the task status field, 127*a* or 127*b* according to the table selected, the value "SW_TRG", which can be, for instance, represented with a value equal to 2, is written.

Lastly, on the occurrence of a stop signal 904, the task recording circuit 120 reads the periodic task signal 905 and selects the table to save the data accordingly i.e., selects the periodic tasks table 121 if the periodic task signal 905 is asserted or, on the contrary, the non-periodic tasks table 122 if the periodic task signal 905 is de-asserted.

Successively, the task timestamp signal 907 is read in order to select the proper record of the selected table i.e., the correct row $RP_j$ or $RN_j$ according to a chronological order. After the record is selected, the task number signal 906 is read and copied in the corresponding task number field, 123*a* or 123*b* according to the table selected, then the task recording circuit 120 writes in the task stop time field, 126*a* or 126*b* according to the table selected, the value read from the counter capture signal 910. Then, finally, in the task status field, 127*a* or 127*b* according to the table selected, the value "STOP", which can be, for instance, represented with a value equal to 3, is written.

Upon the writing of a "STOP" value in a task status field 127*a* or 127*b*, belonging to a record $RP_j$ or $RN_j$, the record checking sub-circuit 128 compares the task number 123*a* or 123*b* with an expected value i.e., checks whether the tasks are executed in a correct order, thus performing a logical task monitoring operation. To this end, the record checking sub-circuit 128 may store, for example in a table, an expected order of execution to be compared to the recorder order.

Always following the occurrence of writing a "STOP" value in a task status field 127*a* or 127*b* belonging to a record $RP_j$ or $RN_j$, the record checking sub-circuit 128 calculates a task duration of the corresponding record $RP_j$ or $RN_j$, defined as the difference between the task stop time 126*a* or 126*b* and the task start time 124*a* or 124*b*. The task duration is then compared to a reference value i.e., it is checked whether a task is executed in an acceptable amount of time, thus performing a temporal task monitoring operation. In various embodiments, such operation of comparing the task duration to a reference value can be substituted by checking whether the task duration is comprised within a time range, defined by a minimum time threshold and a maximum time threshold. Thus, such the record checking sub-circuit 128, in particular in a table, may store the expected reference value or, alternatively, reference time range, and in particular also the expected value for task number 123*a*.

Thus, based on the above, the circuit for performing logical and temporal task monitoring, 100, of a plurality of tasks executed in a processing system, e.g., task of a microprocessor or a microcontroller or an ECU (Electronic Control Circuit) the circuit 100 comprising a task management circuit, e.g., 110 and a task recording circuit, e.g., 120. The task management circuit 110, receiving as input a plurality of task signals, such as $TS_1 \ldots TS_N$, each task signal, for instance $TS_i$, being indicative of an execution state of a respective task, and comprising a managing circuit, e.g., the signal manager circuit 130, which is configured to operate in at least three modes, in the example 500, 600, 700, depending on a respective event, corresponding to either the detection of a rising edge, e.g., $RS_i$, e.g., software trigger signal 114, falling edge $FS_i$, of a given task signal, i.e., $TS_i$, an occurrence of a trigger signal, e.g., 114 or detection of a falling edge, e.g., $FS_i$, of a given task signal, i.e., $TS_i$, being monitored, i.e., processed by the circuit 100;

- in each mode, e.g., 500, 600, 700, the managing circuit, 130, being configured to check whether a variable representing the operation state of the task, $TS_i$, contains an expected value in correspondence of the occurrence of the event, e.g., $RS_i$, 114, $FS_i$, enabling the respective mode, e.g., 500, 600, 700, outputting a result of the check operation in an error signal, the signal 908, for the given task, $TS_i$, being monitored. This portion of the circuit performs thus a logical monitoring.

Then, to perform the temporal monitoring, the task management circuit, e.g., 110, is configured to in each of the at least three modes, 500, 600, 700, is also configured to:

- store in a shared timestamp register, e.g., 132, a first timestamp value, indicated by 907, corresponding to the occurrence of the event;
- send a respective command, i.e., one of the commands 902, 903, 904 which then control the operation of the recording circuit 120, for each respective mode 500, 600, 700, determined by a respective event, $RS_i$, 114, $FS_i$, to such task recording circuit, 120;
- store a second timestamp, indicated in the example by 905, in a capture register, 116, corresponding to the sending of each of the respective command, e.g., 902, 903, 904;
- send a timestamp value in the first timestamp register, 135, to the task recording circuit, 120;
- the task recording circuit, 120, comprising at least a table information structure, e.g., tables 121, 122, although in embodiments a sole table without periodic/non-periodic distinction may be present, comprising records storing the second timestamp value, e.g., 905, and storing such command, e.g., 902, 903, 904, each record corresponding to a first timestamp value, 907, i.e., the first timestamp value 907 indicates in which row of the table 121,122 store the information;

the task recording circuit, e.g., 120, being configured to compute for the given task, $TS_i$, being monitored, on the basis of the second timestamp value, 905, stored for the given task, $TS_i$, in correspondence of each one of the events, $RS_i$, 114, $FS_i$, a duration of the given task, $TS_i$, being monitored, and to check whether the duration of the given task, $TS_i$, being monitored corresponds to a duration expected value, i.e., to a one determined value, or is comprised within a range of duration values, outputting a signal 909 indicating error if the given task $TS_i$ has duration different from the duration expected value or outside the range.

As mentioned, the second timestamp may be stored as a single value then sent to the task recording circuit 120, e.g., at the end of the mode 500, 600, 700, while in variant embodiments the register 116 may store two or three second timestamps, corresponding to start signal 902 and stop signal 904, or to start signal 902, a software trigger signal 903 or a stop signal 904 respectively and send them at the same time in the capture signal 910, i.e., storing them at the same time in the recording circuit 120, e.g., after the 'STOP' signal.

Thus, the advantages of the solution described hereabove are clear. The proposed solution allows to perform temporal and logical task monitoring of a plurality of tasks executed in a processing system while avoiding while avoiding further resources overhead due to such task monitoring operation. Moreover, the proposed solution also provides the advantage of allowing the user to have increased flexibility to insert control flow checkpoints. Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A monitoring circuit for performing logical and temporal task monitoring of a plurality of tasks executed in a processing system, the monitoring circuit comprising:

a task management circuit configured to receive as input a plurality of task signals, each task signal indicating an execution state of a respective task;

wherein the task management circuit comprises a managing circuit configured to:

operate in at least three modes depending on a respective event corresponding to either a detection of a rising edge or a falling edge of a given task signal in the plurality of task signals being monitored, or an occurrence of a trigger signal; and in each mode, check whether at least a variable representing an operation state of the respective task contains an expected value corresponding to an occurrence of the respective event enabling the respective mode, and output a result of the check in an error signal for the respective task being monitored;

wherein the task management circuit is configured to:

store a first timestamp value corresponding to the occurrence of the respective event;

send a respective command for each respective mode determined by the respective event to a task recording circuit; and store a second timestamp value corresponding to the sending of the respective command for each respective mode determined by the respective event; and the task recording circuit, communicatively coupled to the task management circuit and configured to:

compute for a given task being monitored, based on the second timestamp value stored for the given task in correspondence of the respective event, a duration of the given task being monitored;

check whether the duration of the given task being monitored corresponds to a duration expected value or is within a range of duration values; and output a signal indicating an error if the duration of the given task is different from the duration expected value or outside the range.

2. The monitoring circuit according to claim 1, wherein the managing circuit is configured to check a first variable indicating whether the given task is active or not active before the occurrence of the respective event.

3. The monitoring circuit according to claim 2, wherein the managing circuit is further configured to check a second variable indicating the respective mode before the occurrence of the respective event.

4. The monitoring circuit according to claim 1, wherein:

the task management circuit, in each of the at least three modes, is further configured to:

store the first timestamp value in a shared timestamp register;

store the second timestamp value in a capture register; and send the first and second timestamp values to the task recording circuit; and the task recording circuit comprises at least a table information structure comprising a plurality of records storing the second timestamp values and storing the corresponding commands, each record corresponding to the first timestamp value.

5. The monitoring circuit according to claim 4, wherein the error signal comprises a timestamp of the checking of the error.

6. The monitoring circuit according to claim 5, wherein the task management circuit comprises a plurality of edge detector circuits, wherein each edge detector circuit is coupled to a respective task signal, and is configured to generate a detectable pulse signal.

7. The monitoring circuit according to claim 6, wherein the task management circuit further comprises:

a free-running counter; and a counter capture register configured to store values captured from the free-running counter corresponding to times of occurrence of the events, in the plurality of tasks.

8. The monitoring circuit according to claim 7, wherein the task management circuit further comprises:

a task reload selection register configured to store an identifier of the given task signal being monitored among the plurality of task signals;

a task enable register configured to store a bit corresponding to each task signal of the plurality of task signals, the bit indicating whether a respective task signal is being monitored or not; and a task software trigger register being configured to store a plurality of bits corresponding to the plurality of task signals, a bit asserted in the plurality of bits determining the task management circuit to generate as a software trigger signal a detectable pulse signal.

9. The monitoring circuit according to claim 8, wherein the managing circuit comprises:

a timestamp counter;

a task number register storing a task number identifying which given task signal is being monitored;

a shared task timestamp register is configured to store, a first timestamp of the timestamp counter;

a task error register configured to store, upon the occurrence of an error, the timestamp of the checking of the error;

a plurality of task execution registers corresponding to respective task signals storing the variable representing the operation state of the respective task;

a plurality of task timestamp registers, each storing a value in the shared task timestamp register when the respective task signal is being monitored; and a plurality of task status registers storing a value representing a status for each task signal, the status corresponding to the respective command;

wherein the managing circuit is configured to:

receive as input the signals generated by the plurality of edge detector circuits, data from the task reload selection register, data from the task enable register, data from a task periodic register, and data from the task software trigger register; and generate a set of output signals to the recording circuit comprising the commands which comprise a start signal, the software trigger signal, a stop signal, and a task number signal, a task timestamp signal and a task error signal, a content of which depends on according to which of the at least three modes, depending on the respective event, the managing circuit is operating.

10. The monitoring circuit according to claim 9, wherein, in response to the detection of a rising edge of a task signal among the plurality of task signals, the managing circuit is configured to operate in a first mode of operation, and comprises, in order:

first checking whether a value stored in the task execution register is equal to a first expected value in correspondence of the occurrence of the event enabling the first mode, and in response to the first checking being negative, outputting a result of the first checking in the error signal for the given task being monitored comprises issuing the task error signal comprising a timestamp of the checking of the error;

writing in the task number register a value indicating which task signal among the plurality of task signals is being monitored;

reading a value stored in the timestamp counter and copying the value in the respective shared task timestamp register for the given task signal, increasing the value stored in the timestamp counter;

writing in the task execution register the first expected value in correspondence of the occurrence of a first next expected event;

reading the value stored in the shared task timestamp register and copying the value in the task timestamp register of the given task signal;

writing in the task status register the respective command corresponding to the first mode; and generating a corresponding first mode command, which is received by the task recording circuit.

11. The monitoring circuit according to claim 10, wherein, in response to the detection of a software trigger for a task signal among the plurality of task signals, the managing circuit is configured to operate in a second mode of operation, comprising, in order:

second checking whether a value stored in the task execution register is equal to a second expected value in correspondence of the occurrence of the event enabling the second mode, and in response to the second checking being negative, outputting a result of the second checking in the error signal for the given task being monitored comprises issuing the task error signal comprising a timestamp of the checking of the error;

writing in the task number register a value indicating which task signal among the plurality of task signals is being monitored;

reading a value stored in the task timestamp register of the given task signal and copying the value in the respective shared task timestamp register for the given task signal;

writing in the task status register the command corresponding to the second mode; and generating a corresponding second mode command, which is received by the task recording circuit.

12. The monitoring circuit according to claim 11, wherein, in response to the detection of a falling edge for a task signal among the plurality of task signals, the managing circuit is configured to operate in a third mode of operation, comprising, in order:

third checking whether a value stored in the task execution register is equal to a third expected value in correspondence of the occurrence of the event enabling the third mode, and in response to the third checking being negative, outputting a result of the third checking in the error signal for the given task being monitored comprises issuing the task error signal comprising a timestamp of the checking of the error;

writing in the task number register a value indicating which task signal among the plurality of task signals is being monitored;

reading a value stored in the task timestamp register of the given task signal and copying the value in the respective shared task timestamp register for the given task signal;

writing in the task execution register the third expected value in correspondence of the occurrence of a second next expected event;

writing in the task status register the command corresponding to the third mode; and generating a corresponding third mode command, which is received by the task recording circuit.

13. The monitoring circuit according to claim 12, wherein the task recording circuit is configured to, in response to detecting an occurrence of one of the commands:

read the task timestamp signal and selecting a record among the plurality of records according to the value of the task timestamp signal;

read the value stored in the counter capture register and copying the value in either a task start time, a task latency time, or a task stop time according to the detected command; and write in a task status field of the record selected previously a value representative of whether a start signal, the software trigger signal or a stop signal occurrence is detected.

14. The monitoring circuit according to claim 13, wherein the first, second and third modes of operation further comprise checking whether a bit, stored in the task enable register is asserted, in response to the checking the bit being positive, proceeding to a next step, and, in response to the checking the bit being negative, terminating the execution of the first, second or third operation mode.

15. The monitoring circuit according to claim 12, wherein:

the first, second and third modes of operation further comprise reading a bit stored in the task periodic register and producing as output a task periodic signal, being asserted if the bit is asserted and being de-asserted if the bit is de-asserted;

the table information structure comprises records storing the second timestamp value and storing the command, each record corresponding to a first timestamp value comprises a periodic tasks table and a non-periodic tasks table, both comprising records storing the second timestamp value and storing the command, each record corresponding to a first timestamp value, the storing being performed in the periodic tasks table or in the a non-periodic tasks table depending on the bit stored in the task periodic register being asserted or not respectively; and the recording circuit is configured to read the periodic task signal and selecting the periodic tasks table or the non-periodic tasks table according to a value of the task periodic signal.

16. The monitoring circuit according to claim 10, wherein the first mode of operation further comprises:

fourth checking whether a value, stored in the task reload selection register and being associated to a first task signal, is associated to the task signal being monitored; and in response to the fourth checking being positive, generating a reload signal being received by the timestamp counter to reset the value stored therein; or in response to the fourth checking being negative, proceeding to a next step.

17. The monitoring circuit according to claim 12, wherein the third mode of operation further comprises resetting the task timestamp register to a default value.

18. The monitoring circuit according to claim 12, wherein the task recording circuit further comprises a record checking sub-circuit configured to perform, in response to detecting an occurrence of a stop signal, in order:

comparing the task number of the record corresponding to the occurrence of the stop signal to an expected task number;

computing a task duration of the given task, as the difference between a task stop time and a task start time, of the record corresponding to the occurrence of the stop signal;

comparing the task duration of the given task to an expected task duration and/or to a minimum threshold value and to a maximum threshold value; and outputting a signal indicating error if the duration of the given task is different from the duration expected value or outside the range upon detecting that the task duration of the given task is smaller than then minimum threshold value or greater than the maximum threshold value, generating a task record error message.

19. A method for performing logical and temporal task monitoring of a plurality of tasks executed in a processing system, the method comprising:

receiving, by a task management circuit of the processing system, as input, a plurality of task signals, each task signal indicating an execution state of a respective task;

operating, by a managing circuit of the task management circuit, in at least three modes depending on a respective event corresponding to either a detection of a rising edge or a falling edge of a given task signal in the plurality of task signals being monitored, or an occurrence of a trigger signal;

in each mode:

checking, by the managing circuit, whether at least a variable representing an operation state of the respective task contains an expected value corresponding to an occurrence of the respective event enabling the respective mode, and outputting, by the managing circuit, a result of the check in an error signal for the respective task being monitored;

storing, by the task management circuit, a first timestamp value corresponding to the occurrence of the respective event;

sending, by the task management circuit, a respective command for each respective mode determined by the respective event to a task recording circuit of the processing system;

storing, by the task management circuit, a second timestamp value corresponding to the sending of the respective command for each respective mode determined by the respective event;

computing, by the task recording circuit, for a given task being monitored, based on the second timestamp values stored for the given task in correspondence of each one of the events, a duration of the given task being monitored;

checking, by the task recording circuit, whether the duration of the given task being monitored corresponds to a duration expected value or is within a range of duration values; and outputting, by the task recording circuit, a signal indicating error in response to the duration of the given task being different from the duration expected value or outside the range.

20. The method according to claim 19, further comprising checking, by the managing circuit, a first variable indicating whether the respective task is active or not active before the occurrence of the respective event.

21. The method according to claim 19, further comprising, in each of the at least three modes:

storing, by the task management circuit, the first timestamp value in a shared timestamp register;

storing, by the task management circuit, the second timestamp value in a capture register;

sending, by the task management circuit, the first and second timestamp values to the task recording circuit; and storing, by the task recording circuit, at least a table information structure including a plurality of records including the second timestamp values and the corresponding commands, each record corresponding to the first timestamp value.

* * * * *